United States Patent [19]
Wolfe et al.

[11] Patent Number: 5,930,417
[45] Date of Patent: Jul. 27, 1999

[54] SWITCH APPARATUS

[75] Inventors: George B. Wolfe, Plymouth; Michael W. Malesko, Ann Arbor, both of Mich.

[73] Assignee: TRW Inc., Lyndhurst, Ohio

[21] Appl. No.: 09/025,594

[22] Filed: Feb. 18, 1998

[51] Int. Cl.$^6$ .................................................. G02B 6/26
[52] U.S. Cl. .............................. 385/16; 385/19; 385/140
[58] Field of Search .................................. 385/16, 17, 18, 385/19, 20, 21, 22, 23, 140

[56] References Cited

U.S. PATENT DOCUMENTS

| | | | |
|---|---|---|---|
| 4,721,351 | 1/1988 | Goepfert et al. | 385/16 |
| 5,069,519 | 12/1991 | James et al. | 385/32 |
| 5,311,614 | 5/1994 | Caron et al. | 385/140 |
| 5,319,734 | 6/1994 | Buzzetti | 385/140 |
| 5,334,832 | 8/1994 | Levinson et al. | 250/227.24 |
| 5,430,815 | 7/1995 | Shen et al. | 385/13 |

*Primary Examiner*—Phan Palmer
*Attorney, Agent, or Firm*—Tarolli, Sundheim, Covell Tummino & Szabo

[57] ABSTRACT

A switch apparatus includes a carrier for an optical cable. The carrier supports the optical cable in a U-shaped configuration with parallel leg portions of the optical cable extending along opposite sides of the carrier. A pushbutton is supported by the optical cable. The pushbutton has actuation arms which engage the parallel leg portions of the optical cable. The optical cable is held by flexible arms which form channels into which the leg portions of the optical cable are snapped. Upon manual actuation of the pushbutton, the optical cable is deformed to reduce the intensity of a light beam transmitted through the optical cable.

8 Claims, 2 Drawing Sheets

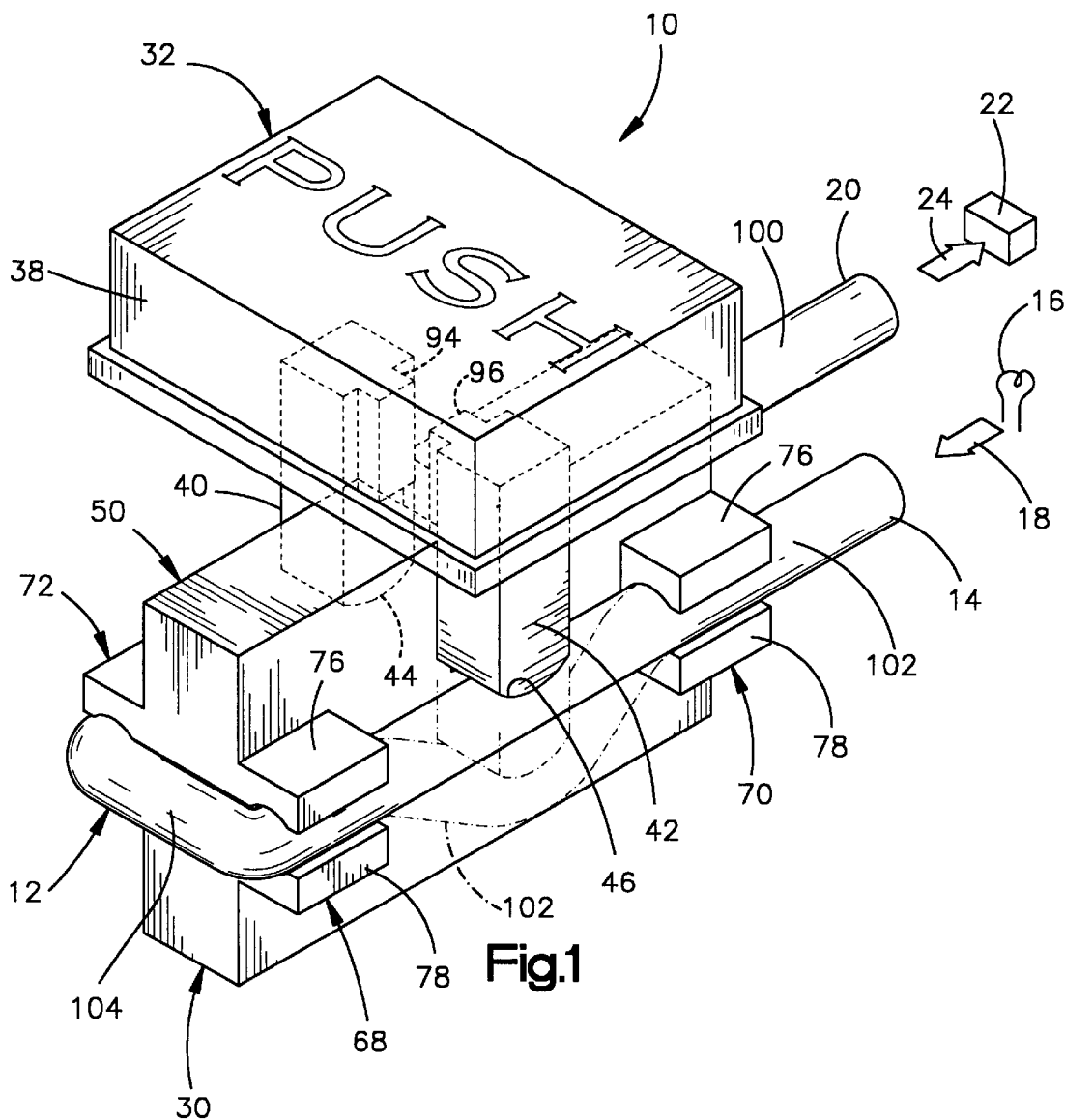

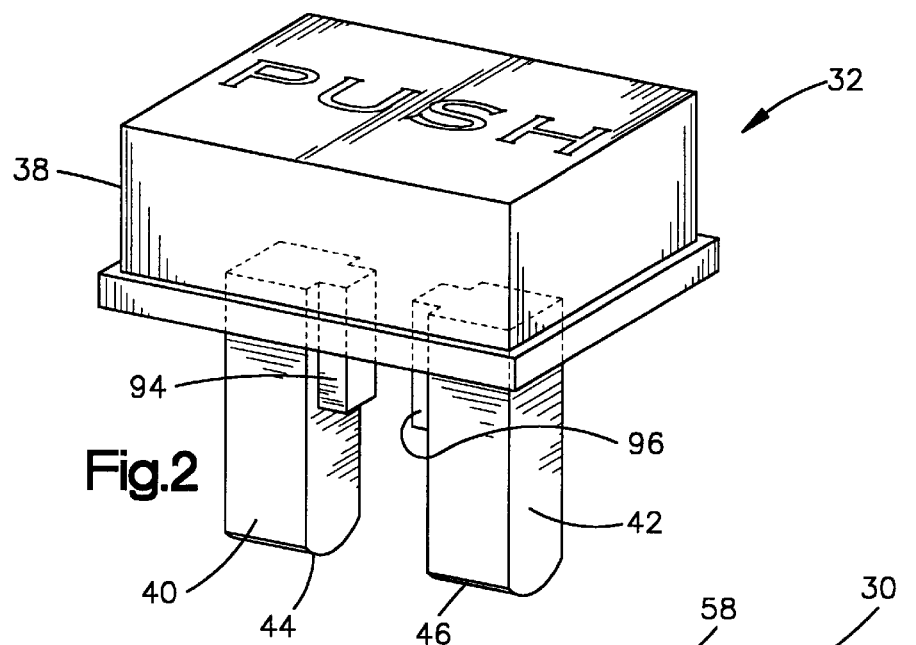
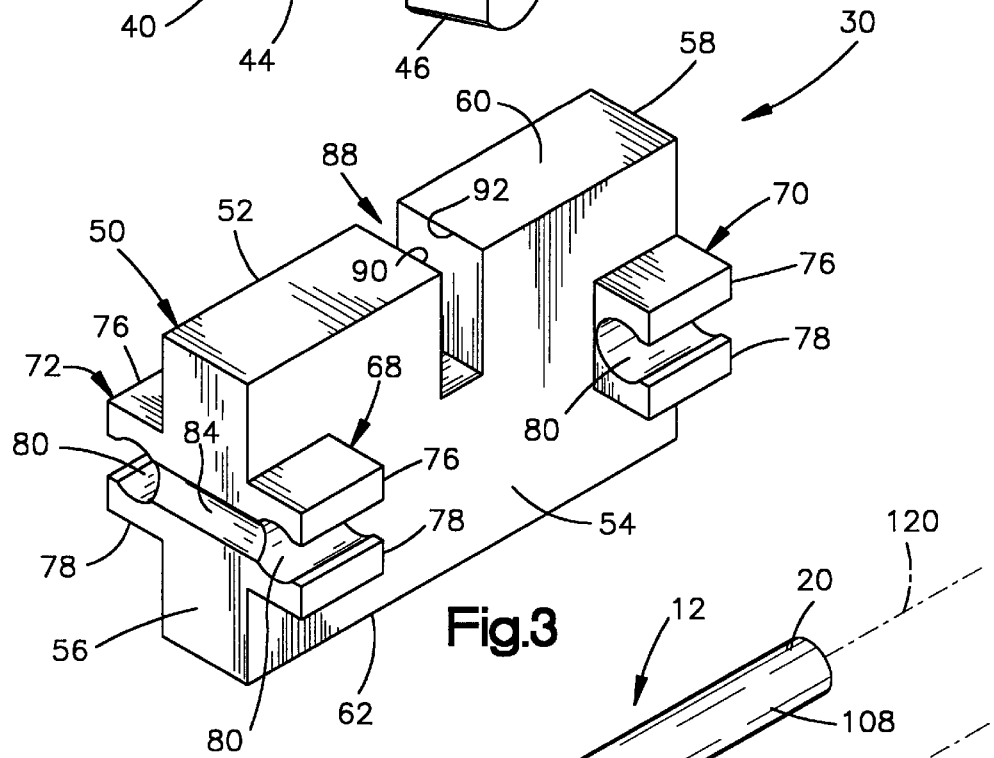
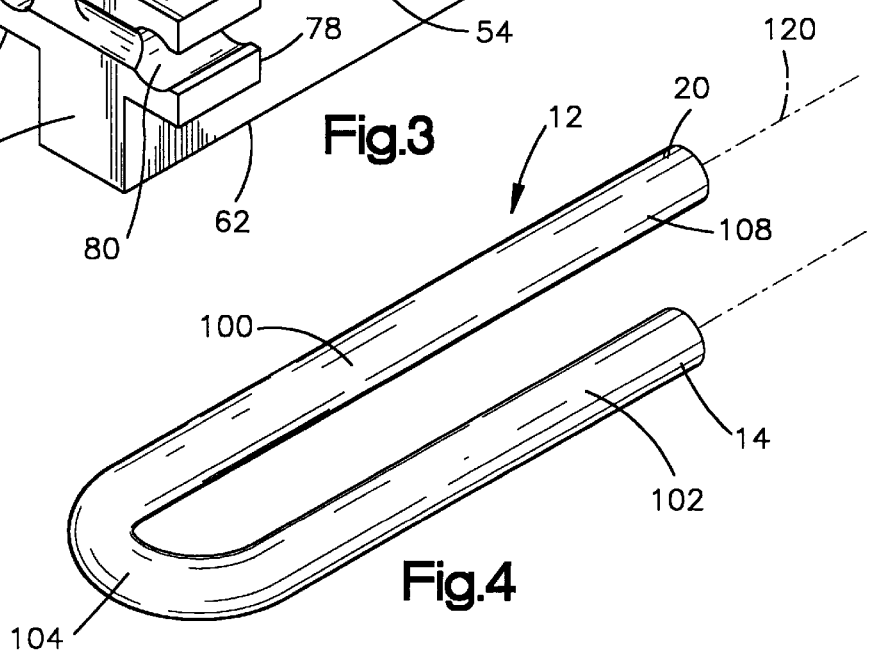

SWITCH APPARATUS

BACKGROUND OF THE INVENTION

The present invention relates to a switch apparatus which provides an output signal upon manual actuation of a pushbutton.

A known switch apparatus has a movable contact which is moved into engagement with a stationary contact upon manual actuation of the switch assembly. The force between the contacts, electrical noise, and dirt or oxides have long been a problem with switch assemblies having this known construction. There is a need for a low effort, low current switch apparatus which is relatively inexpensive and reliable.

SUMMARY OF THE INVENTION

An improved switch apparatus includes a carrier which holds an optical cable and a pushbutton which is movable relative to the carrier. Upon movement of the pushbutton relative to the carrier, the optical cable is deformed and the ability of the cable to transmit light decreases. Upon actuation of the pushbutton, the change in the light beam is sensed to provide an output signal.

The carrier for the optical cable has flexible arms. The flexible arms define a channel in which the optical cable may be snapped. Upon actuation of the pushbutton, a portion of the optical cable is deformed and the light transmitted through the optical cable decreases.

The optical cable is supported in a U-shaped configuration by the carrier. The optical cable has two leg portions which are interconnected by a connector portion. The pushbutton is movable relative to the carrier to deform the leg portions of the optical cable.

BRIEF DESCRIPTION OF THE DRAWINGS

The foregoing and other features of the invention will become more apparent upon a consideration of the following description taken in connection with the accompanying drawings wherein:

FIG. 1 is a pictorial illustration of a switch apparatus constructed in accordance with the present invention and having a pushbutton which is movable relative to a carrier to act on an optical cable;

FIG. 2 is a pictorial illustration of the pushbutton used in the switch apparatus of FIG. 1;

FIG. 3 is a pictorial illustration of the carrier used in the switch apparatus of FIG. 1; and FIG. 4 is a pictorial illustration of a portion of the optical cable of FIG. 1.

DESCRIPTION OF ONE SPECIFIC PREFERRED EMBODIMENT OF THE INVENTION

A switch apparatus 10 (FIG. 1), constructed in accordance with the present invention, is operable to deform an optical cable 12. The optical cable 12 includes an inlet 14 to which light from a source 16 is conducted in a manner indicated by an arrow 18 in FIG. 1. Light is conducted through the optical cable 12 to an outlet 20. The light is conducted from the outlet 20 to a light sensor 22 in a manner indicated by an arrow 24 in FIG. 1.

The switch apparatus 10 includes a carrier 30 which supports the optical cable 12 in a generally U-shaped configuration. A pushbutton 32 is supported by the optical cable 12. The pushbutton 32 is manually movable relative to the carrier 30 to deform the optical cable 12. Deformation of the optical cable 12 decreases the light transmissivity of the cable and thus reduces the intensity of the light beam transmitted from the light source 16 through the optical cable to the light sensor 22.

Upon manual actuation of the pushbutton 32 and deflection of the optical cable 12, the amount of light conducted from the light source 16 through the optical cable to the light sensor 22 is reduced. In response to this reduction in the amount of light which is received by the light sensor 22, an output signal is provided by the light sensor to effect a control function.

The pushbutton 32 (FIG. 2) includes a rectangular, manually engageable, head end portion 38. A pair of parallel, rectangular, actuation arms 40 and 42 extend downward (as viewed in FIG. 2) from the head end portion 38 of the pushbutton 32. The actuation arms 40 and 42 have arcuate end surfaces 44 and 46 which engage the optical cable 12 in the manner illustrated in FIG. 1.

Engagement of the arcuate end surfaces 44 and 46 (FIG. 2) on the actuation arms 40 and 42 with the optical cable 12 supports the pushbutton 32 in the extended or unactuated position of FIG. 1. When manual force is applied against the head end portion 38 of the pushbutton 32, the actuation arms 40 and 42 move along the carrier 30 and deform the optical cable 12. Deformation of the optical cable 12 decreases the ability of the cable to transmit light and thereby reduces the amount of light received by the light sensor 22.

The carrier 30 has a rectangular body 50 (FIG. 3). The rectangular body 50 has parallel rectangular major side surfaces 52 and 54. A pair of parallel rectangular end surfaces 56 and 58 extend between the major side surfaces 52 and 54. Parallel upper and lower rectangular side surfaces 60 and 62 extend between the end surfaces 56 and 58 and between the major side surfaces 52 and 54.

The optical cable 12 is supported adjacent to the major side surface 54 on the body 50 of the carrier 30 by a pair of gripper assemblies 68 and 70. Although only a single gripper assembly 72 is illustrated in FIG. 3 adjacent to the major side surface 52 of the carrier 30, it should be understood that a second gripper assembly extends from the major side surface 52 of the carrier 30. This second gripper assembly (not shown) which extends from the major side surface 52 is disposed adjacent to the end surface 58 in the same manner as in which the gripper assembly 70 extends from the major side surface 54 of the carrier 30.

Each of the gripper assemblies 68, 70 and 72 has the same construction. Thus, each of the gripper assemblies 68, 70 and 72 includes flexible upper and lower arms 76 and 78. The flexible arms 76 and 78 cooperate to define cylindrical channels 80 in which the optical cable 12 is received. The flexible arms 76 and 78 are deflectable to enable portions of the optical cable 12 to be snapped into the cylindrical channels 80. Longitudinal central axes of the cylindrical channels 80 extend parallel to the major side surfaces 52 and 54 on the body 50 of the carrier 30.

A recess 84 extends across the end surface 56 between the gripper assemblies 68 and 72. The recess 84 engages a portion of the optical cable 12 to position the optical cable relative to the body portion 50 of the carrier 30.

The body 50 of the carrier 30 is provided with a rectangular slot 88 which guides movement of the pushbutton 32 (FIG. 2) relative to a carrier (FIG. 3). The slot 88 has parallel rectangular side surfaces 90 and 92 which engage rectangular followers 94 and 96 (FIG. 2) on the actuation arms 40 and 42 to guide movement of the pushbutton 32 between an initial or extended position and a retracted or actuated position.

The pushbutton 32 is illustrated in solid lines in the extended position in FIG. 1. Upon the application of manual force against the head end portion 38 of the pushbutton 32, the followers 94 and 96 move downward (as viewed in FIGS. 1 and 2) along the slot 88 (FIG. 3) in the body portion 50 of the carrier 30. This guides movement of the pushbutton 32 relative to the carrier 30.

The portion of the optical cable 12 which is received in the switch apparatus 10 (FIG. 1) has a generally U-shaped configuration. Thus, the optical cable 12 includes a linear leg portion 100 (FIG. 4) which is received in the gripper assemblies disposed adjacent to the major side surface 52 of the carrier 30 (FIG. 3). Thus, the leg portion 100 of the optical cable 12 (FIG. 4) is gripped by the gripper assembly 72 (FIG. 3) and by a second gripper assembly (not shown) which extends outward from the major side surface 52 and is disposed adjacent to the end surface 58 of the carrier 30.

The optical cable 12 has a second leg portion 102 (FIG. 4) which extends parallel to the leg portion 100. The second leg portion 102 of the optical cable 12 is engaged by the gripper assemblies 68 and 70 (FIG. 3) which extend outward from the major side surface 54 of the carrier 30. The optical cable 12 has a connector portion 104 (FIG. 4) which extends between the leg portions 100 and 102 and is received in the recess 84 in the end surface 56 of the carrier 30 (FIG. 3).

The optical cable 12 has a cylindrical outer side surface 108 with a diameter which is slightly greater than the diameter of the cylindrical channels 80 formed in the gripper assemblies 68, 70 and 76 on the carrier 30. When the optical cable is to be mounted on the carrier 30, the leg portions 100 and 102 are snapped into the channels 80 extending through gripper assemblies 68, 70 and 72.

When the leg portion 102 of the optical cable 12 is to be positioned on the carrier 30, the leg portion is pressed against the flexible arms 76 and 78 of the gripper assembly 70. The manual application of force against the leg portion 102 of the optical cable 12 snaps the optical cable into the channel 80 of the gripper assembly 70. The leg portion 102 is snapped into the channel 80 of the gripper assembly 68 in the same manner as was previously described in conjunction with the gripper assembly 70. Similarly, the leg portion 100 on the optical cable 12 is snapped into the gripper assembly 72 and into a second gripper assembly (not shown) which extend from the major side surface 52 of the carrier 30.

Once the optical cable 12 has been positioned on the carrier 30, the pushbutton 32 is positioned on the carrier. When the pushbutton 32 is to be positioned on the carrier 30, the followers 94 and 96 (FIG. 2) are moved into the slot 88 (FIG. 3). At this time, the actuation arms 40 and 42 engage the parallel major side surfaces 52 and 54 on the carrier 30. This results in the pushbutton 32 being positioned relative to the carrier 30 and being movable along the slot 88 relative to the carrier.

When the pushbutton 32 is disposed on the carrier 30, the pushbutton is supported by engagement of the actuation arms 40 and 42 with the leg portions 100 and 102 of the optical cable 12 (FIGS. 1 and 4). The pushbutton 32 is relatively light and, in the absence of manual pressure against the pushbutton, there is no significant deformation of the optical cable 12 by the pushbutton. At this time, light is freely transmitted from the light source 16 through the optical cable 12 to the light sensor 22.

Upon the manual application of force against the pushbutton 32, the actuation arms 40 and 42 move downward (as viewed in FIG. 1). This resiliently deforms the leg portions 100 and 102 of the optical cable 12 and reduces the ability of the optical cable 12 to transmit light along the longitudinal central axis 120 (FIG. 4) of the optical cable. This results in a decrease in the amount of light transmitted to the light sensor 22. In response to the decrease in the amount of light transmitted to the light sensor 22, a control function is initiated.

When the pushbutton 32 is manually forced downward (as viewed in FIG. 1) from the initial or extended position to a retracted or actuated position, the arcuate end surfaces 44 and 46 on the actuator arms 40 and 42 apply force against the leg portions 100 and 102 of the optical cable 12. This force resiliently deflects the leg portions 100 and 102 of the optical cable downward (as viewed in FIG. 1) and deforms the optical cable to a noncircular cross-sectional configuration adjacent to the areas engaged by the actuation arms 40 and 42 on the pushbutton 32.

When the pushbutton 32 is manually released, the resilience of the optical cable 12 returns the leg portions 100 and 102 of the optical cable to their initial linear configuration illustrated in solid lines in FIGS. 1 and 4. As this occurs, the side wall of the optical cable returns to its initial circular cross-sectional configuration adjacent to the portions of the optical cable engaged by the actuation arms 40 and 42 of the pushbutton 32. This results in an unimpeded transmission of light from the light source 16 through the optical cable 12 to the light sensor 22.

From the above description of the invention, those skilled in the art will perceive improvements, changes and modifications. Such improvements, changes and modifications within the skill of the art are intended to be covered by the appended claims.

Having described the invention, the following is claimed:

1. A switch apparatus comprising:
an optical cable having an axis;
a light source for sending a light beam axially through said optical cable;
a carrier for said optical cable, said carrier having flexible arms defining a channel into which said optical cable may be snapped;
a pushbutton, said pushbutton and said optical cable having cooperating parts supporting said push button on said carrier for linear movement relative to said carrier;
said pushbutton having an actuating portion for engaging a portion of said optical cable spaced from said flexible arms and deforming said portion of said optical cable to reduce the ability of the optical cable to transmit said light beam; and
means for sensing the reduction of the transmitted light beam.

2. A switch apparatus as set forth in claim 1 wherein said carrier includes a base having first and second sides, said flexible arms include a first pair of flexible arms adjacent to said first side of said base and a second pair of flexible arms adjacent to a second side of said base, said first and second pairs of arms cooperating to hold a portion of said optical cable in a U-shaped configuration with a first leg of said optical cable disposed along said first side of said base and a second leg of said optical cable disposed along said second side of said base, said actuating portion of said pushbutton having a first portion which deforms said first leg of said optical cable and a second portion which deforms said second leg of said optical cable.

3. An apparatus as set forth in claim 1 wherein the flexible arms on said carrier include a first flexible arm and a second flexible arm which engage spaced apart portions of said optical cable, said actuating portion of said pushbutton being engageable with a portion of said optical cable disposed between said spaced apart portions of said optical cable engaged by said first and second flexible arms.

4. A switch apparatus as set forth in claim 1 wherein said pushbutton includes a manually engageable portion and a projection which extends from said manually engageable portion and is engageable with said optical cable.

5. A switch apparatus as set forth in claim 1 wherein said carrier includes a slot which is engaged by said actuating portion of said pushbutton to guide movement of said pushbutton relative to said carrier.

6. A switch apparatus comprising:

an optical cable having an axis;

a light source for sending a light beam axially through said optical cable;

a carrier for supporting said optical cable in a U-shaped configuration, said optical cable having two parallel extending portions interconnected by a connector portion;

a pushbutton, said pushbutton and said optical cable having cooperating parts supporting said pushbutton on said carrier for movement relative to said carrier;

said pushbutton having first and second actuating portions for engaging said parallel extending portions of said optical cable, respectively, to deform said parallel extending portions of said optical cable to reduce the intensity of the light beam transmitted through said optical cable; and means for sensing the reduction of the intensity of said light beam.

7. A switch apparatus as set forth in claim 6 wherein said carrier includes first and second gripper means for gripping spaced apart portions of a first one of said parallel extending portions of said optical cable, said first actuating portion of said pushbutton being effective to deform said first one of said parallel extending portions of said optical cable at a location disposed between said first and second gripper means, said carrier includes third and fourth gripper means for gripping spaced apart portions of a second one of said parallel extending portions of said optical cable, said second actuating portion of said pushbutton being effective to deform said second one of said parallel extending portions of said optical cable at a location disposed between said third and fourth gripper means.

8. A switch apparatus as set forth in claim 6 wherein said carrier includes surface means for guiding movement of said pushbutton along a linear path relative to said carrier.

* * * * *